United States Patent
Canuto

(10) Patent No.: US 9,562,551 B2
(45) Date of Patent: Feb. 7, 2017

(54) LOCKING DEVICE FOR MECHANICAL PIECES, PARTICULARLY FOR PIECE SUBJECTED TO MECHANICAL PROCESSING OR SIMILAR

(75) Inventor: Almerino Canuto, Casale Sul Sile (IT)

(73) Assignee: FCS SYSTEM SRL, Casale Sul Sile (IT)

( * ) Notice: Subject to any disclaimer, the term of this patent is extended or adjusted under 35 U.S.C. 154(b) by 837 days.

(21) Appl. No.: 13/818,728

(22) PCT Filed: Aug. 24, 2010

(86) PCT No.: PCT/IT2010/000373
§ 371 (c)(1),
(2), (4) Date: Feb. 25, 2013

(87) PCT Pub. No.: WO2012/025945
PCT Pub. Date: Mar. 1, 2012

(65) Prior Publication Data
US 2013/0156491 A1    Jun. 20, 2013

(51) Int. Cl.
*F16B 7/14*     (2006.01)
*B23Q 3/10*     (2006.01)
*B25B 11/00*    (2006.01)

(52) U.S. Cl.
CPC .............. *F16B 7/14* (2013.01); *B23Q 3/106* (2013.01); *B25B 11/00* (2013.01); *Y10T 403/32467* (2015.01)

(58) Field of Classification Search
CPC ............ F16B 7/14; B23Q 3/106; B25B 11/00; Y10T 403/32467
See application file for complete search history.

(56) References Cited

U.S. PATENT DOCUMENTS 500,908 A * 7/1893 Kampf .................... F41A 25/02
                                                    89/43.01
2,453,855 A * 11/1948 Ollver ..................... F15B 15/26
                                                    188/300
(Continued)

FOREIGN PATENT DOCUMENTS

DE        8903660 U1    5/1989

OTHER PUBLICATIONS

International Search Report for corresponding application PCT/IT2010/000373 filed on Aug. 24, 2010; Mail date Apr. 4, 2011.

(Continued)

*Primary Examiner* — Victor MacArthur
(74) *Attorney, Agent, or Firm* — Cantor Colburn LLP

(57) ABSTRACT

A locking device for mechanical pieces, particularly for pieces subjected to mechanical processing or similar, comprising at least one hollow body that forms a sliding seat, a movable stem that is accommodated slidingly partially within the sliding seat of the hollow body and radial expansion elements which are interposed between the hollow body and the movable stem, the radial expansion elements being adapted to mutually lock the hollow body and the movable stem, the movable stem protruding partially from the hollow body with the hollow body and the movable stem jointly associable, at their free ends, by way of elements for connection, respectively, to a mechanical piece to be processed or a fixed part of a machine with which the mechanical piece is to be processed.

9 Claims, 4 Drawing Sheets

(56) References Cited

U.S. PATENT DOCUMENTS

| | | | | |
|---|---|---|---|---|
| 3,528,532 | A * | 9/1970 | Moskow | B60N 2/231 |
| | | | | 188/300 |
| 4,111,068 | A * | 9/1978 | Fletcher | B64C 27/006 |
| | | | | 403/105 |
| 4,453,745 | A * | 6/1984 | Nelson | E21B 33/038 |
| | | | | 285/18 |
| 5,305,992 | A | 4/1994 | Kish | |
| 6,055,762 | A * | 5/2000 | Philpot | A01K 77/00 |
| | | | | 43/11 |
| 7,168,695 | B2 * | 1/2007 | Yonezawa | B23Q 1/009 |
| | | | | 269/309 |
| 7,735,810 | B2 * | 6/2010 | Pope | B62D 25/12 |
| | | | | 188/300 |
| 8,070,095 | B2 * | 12/2011 | Luce | B64C 25/14 |
| | | | | 244/102 SS |
| 8,215,224 | B1 * | 7/2012 | Tortorici, Jr. | F41A 25/04 |
| | | | | 89/198 |
| 8,556,209 | B2 * | 10/2013 | Luce | B64C 25/14 |
| | | | | 244/102 SS |
| 2007/0228234 | A1 * | 10/2007 | Doyle | A47B 9/04 |
| | | | | 248/188.5 |
| 2010/0219290 | A1 * | 9/2010 | Luce | B64C 25/14 |
| | | | | 244/102 SL |

OTHER PUBLICATIONS

Written Opinion for corresponding application PCT/IT2010/000373 filed on Aug. 24, 2010; Mail date Apr. 4, 2011.

* cited by examiner

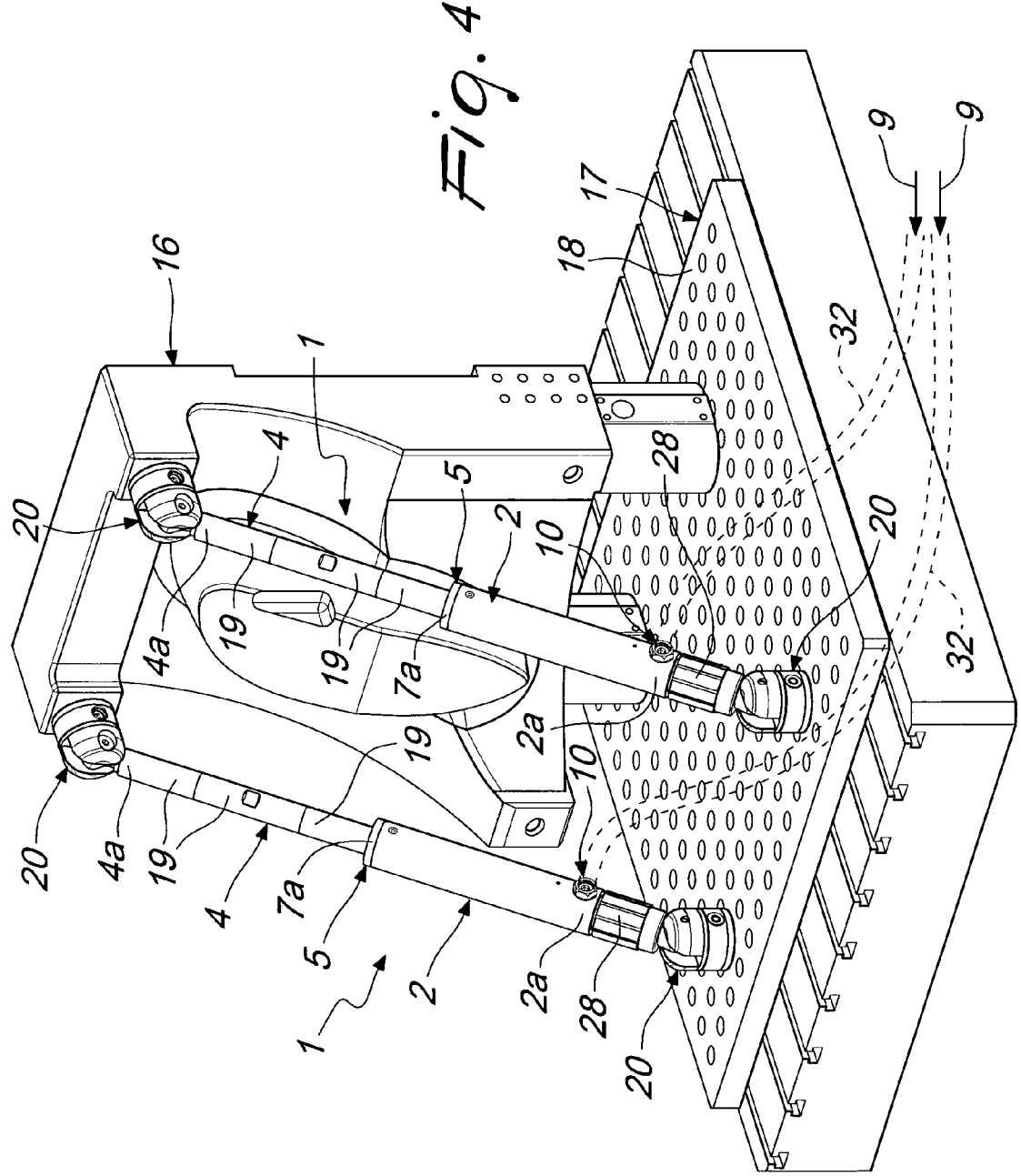

US 9,562,551 B2

LOCKING DEVICE FOR MECHANICAL PIECES, PARTICULARLY FOR PIECE SUBJECTED TO MECHANICAL PROCESSING OR SIMILAR

TECHNICAL FIELD

The present invention relates to a locking device for mechanical pieces, particularly for pieces subjected to mechanical processing or similar.

BACKGROUND ART

In the field of mechanical processing and similar, in particular as regards workshop fixtures, the need is known to be able to lock the piece to be processed with respect to the machine with which the mechanical piece is to be processed in a manner which is safe, repeatable and effective.

This locking occurs, for example, by means of perforated L-shaped elements, which are fixed to the mechanical piece to be processed, by way of holes that are already present thereon, and to a perforated plate, which acts as a resting surface for processing and is fixed to the machine used for the processing.

As an alternative, vises are also known which can be fixed to the perforated plate and are capable of clamping the piece to be processed so as to keep it motionless during processing.

These known types of fixture are not free from drawbacks, which include the fact that since their dimensions and connection systems are standardized, they are scarcely flexible fixing systems, which therefore are not always suitable for locking particular mechanical pieces that do not have holes and geometries that are compatible with such fixtures.

If the mechanical piece to be processed in fact has particularly small geometry and/or dimensions, these known types of fixture cannot always be used, forcing the operator to provide custom fixtures capable of obviating the limitations of fixtures of the standardized type.

Even these custom fixtures of the known type are not free from drawbacks, which include the fact that if they are used to process small batches of pieces, the number of processed pieces is not such as to justify the production costs of such fixture. Such custom fixtures of the known type, in order to be economically convenient, in fact require large production batches.

Another drawback of known types of fixture, both standardized and custom, resides in that they do not allow correct fixing of the piece to be processed. The simple bolting of the fixture to the piece and/or to the perforated plate very often is in fact insufficient to give the correct structural rigidity to the assembly formed by the piece, the fixture and the perforated plate, causing the piece to vibrate during processing and/or to move, reducing considerably the degree of precision of the processing.

A further drawback of known types of fixture is that their use requires a large number of bolting operations, which inevitably lead to an increase in the downtimes linked to machine stops, with consequent reductions in productivity.

DISCLOSURE OF THE INVENTION

The aim of the present invention is to provide a locking device for mechanical pieces, particularly for pieces subjected to mechanical processing or similar, that overcomes and solves, respectively, the limitations and drawbacks of the background art.

Within this aim, an object of the invention is to provide a locking device that is extremely flexible from the point of view of use and is reliable and economically advantageous.

This aim, as well as this and other objects that will become better apparent hereinafter, are achieved by a locking device for mechanical pieces, particularly for pieces subjected to mechanical processing or similar, characterized in that it comprises at least one hollow body that forms a sliding seat, a movable stem that is accommodated slidingly partially within said sliding seat and radial expansion means which are interposed between said hollow body and said movable stem and are adapted to mutually lock said hollow body and said movable stem, said movable stem protruding partially from said hollow body with said hollow body and said movable stem jointly associable, at their free ends, by way of means for connection, respectively, to a mechanical piece to be processed or a fixed part of a machine with which said mechanical piece is to be processed.

BRIEF DESCRIPTION OF THE DRAWINGS

Further characteristics and advantages of the present invention will become apparent from the description of a preferred but not exclusive embodiment of a locking device for mechanical pieces, particularly for pieces subjected to mechanical processing or similar, according to the invention, illustrated by way of non-limiting example in the accompanying drawings, wherein:

FIG. 4 is a perspective view of an example of use of two locking devices according to the present invention.

WAYS OF CARRYING OUT THE INVENTION

Figure 1:
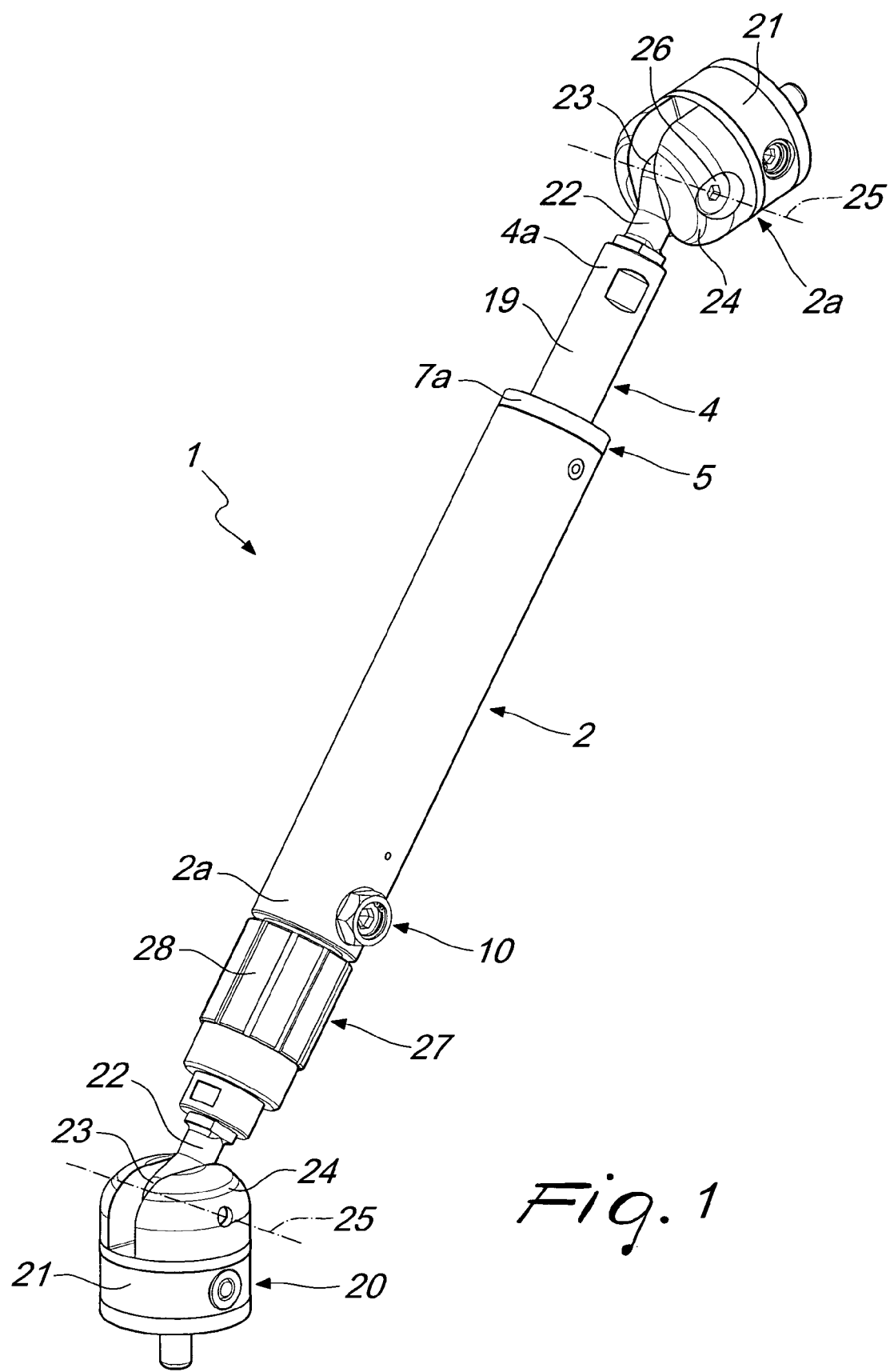
FIG. 1 is a perspective view of a preferred but not exclusive embodiment of a locking device for mechanical pieces, particularly for pieces subjected to mechanical processing or similar, according to the present invention.
Figure 2:
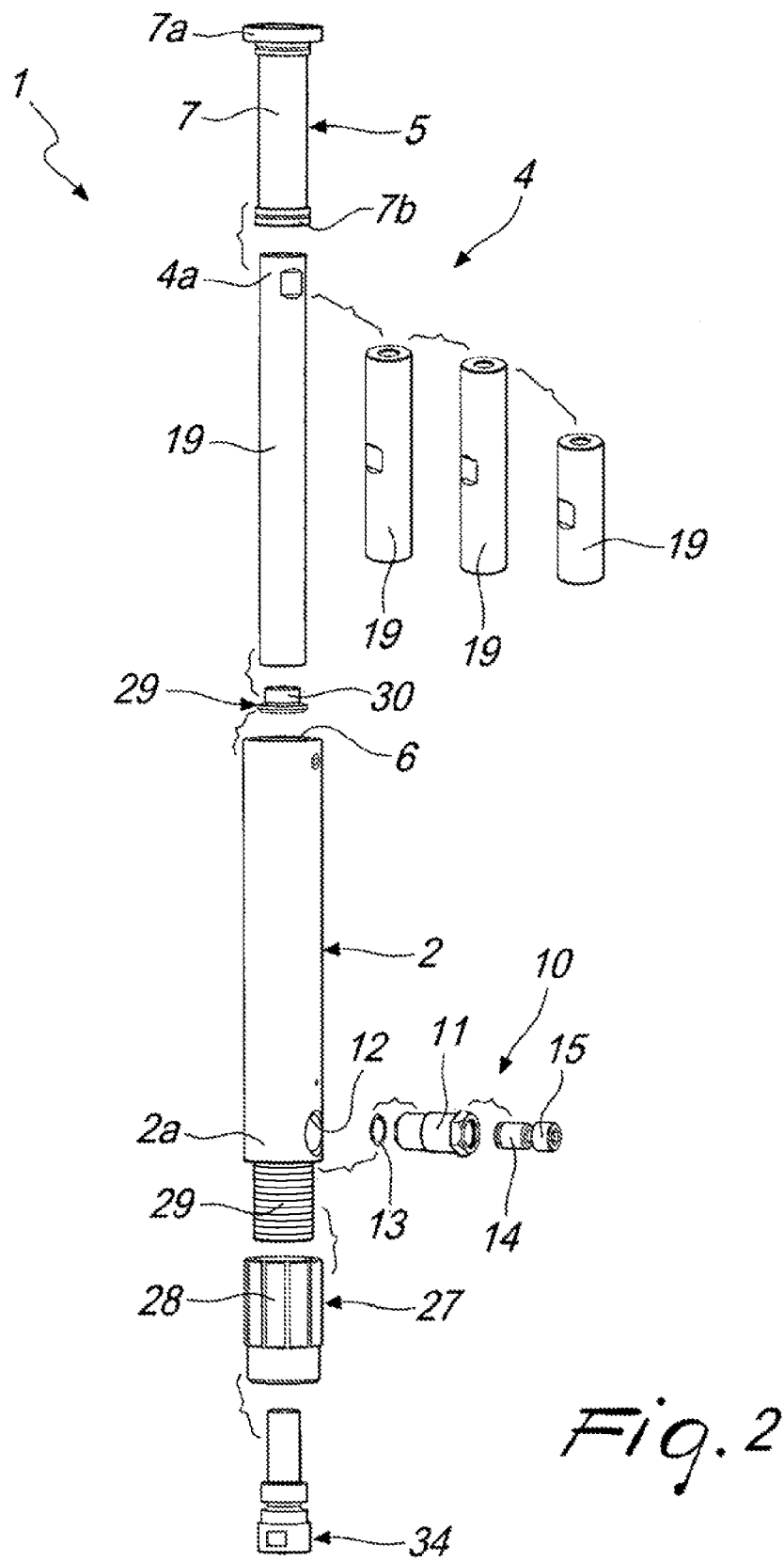
FIG. 2 is an exploded perspective view of the locking device shown in FIG. 1.
Figure 3:
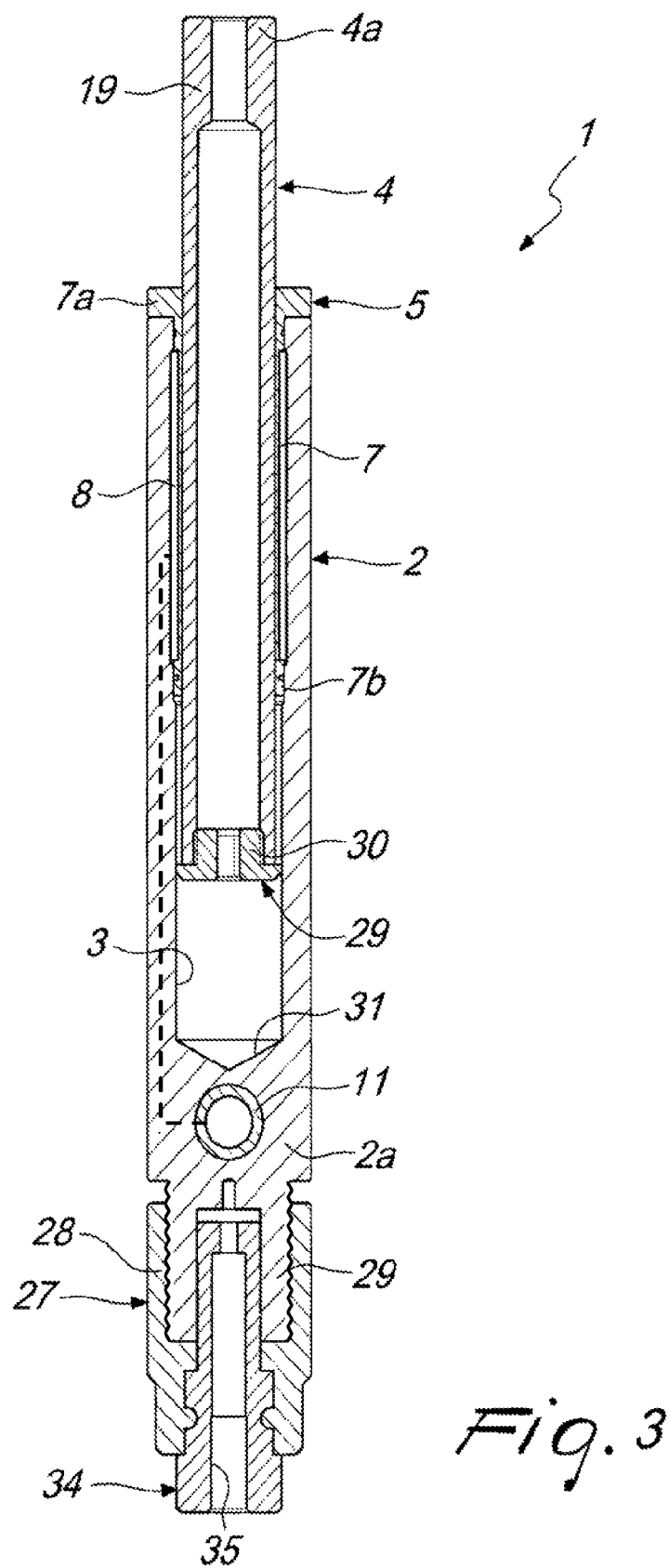
FIG. 3 is a sectional side elevation view of the locking device shown in FIG. 1.

With reference to the figures, a locking device for mechanical pieces, particularly for pieces subjected to mechanical processing or similar, generally designated by the reference numeral 1, comprises at least one hollow body 2, also known as containment jacket, which forms a sliding seat 3, a movable stem 4, which is accommodated slidingly partially within the sliding seat 3, and radial expansion means 5, which are interposed between the hollow body 2 and the movable stem 4 and are adapted to mutually lock the two elements.

In greater detail, the hollow body 2 is substantially cylindrical and the sliding seat 3 is blind, having a single opening 6 through which the movable stem 4 protrudes partially from the hollow body 2.

Advantageously, the radial expansion means 5 comprise a tubular element 7, also known as expansion jacket, which is elastically deformable, is fitted slidingly on the movable stem 4 and is jointly accommodated with play within the sliding seat 3 so as to form, between the outside wall of the tubular element 7 and the inside wall of the sliding seat 3, at least one empty interspace 8, which is closed and can be connected functionally to a system 32 for dispensing a pressurized fluid 9, for example oil, in order to introduce the pressurized fluid 9 in the interspace 8 so as to deform elastically the tubular element 7 in a radial direction and block the translational motions of the movable stem 4 with respect to the hollow body 2 and vice versa, by friction between the movable stem 4 and the tubular element 7, as a consequence of the increase in pressure inside the interspace 8.

More precisely, the tubular element 7 comprises a flanged end 7a, which acts as a closure plug for the sliding seat 3.

Moreover, there is at least one connector element 10, which is jointly connected to the hollow body 2, is connected to the interspace 8 and can be connected to the dispensing system 32 for the passage of the pressurized fluid 9 within the interspace 8.

The connector element 10, which substantially consists of a hydraulic valve, comprises a cylindrical body 11, which can be screwed into a threaded hole 12 which is formed on the surface of the hollow body 2 and is connected to the interspace 8.

A piston 14 is accommodated slidingly within the cylindrical body 11, forms the flow control element of the valve and can be locked therein by means of an elastic ring 13 and a threaded grub 15.

In other words, the hollow body 2 and the movable stem 4, by being mutually lockable, thus form a strut of the type with a variable length, which can be interposed between a mechanical piece 16 to be processed and a fixed part 17, for example a perforated plate 18, of a machine with which the mechanical piece 16 is to be processed, as shown in FIG. 4.

Further, the hollow body 2 and the movable stem 4, the latter composed of a plurality of modular parts 19 according to requirements, can be jointly associated, at their free ends 2a and 4a, by way of connection means 20, respectively with the mechanical piece 16 to be processed or the fixed part 17 of the machine with which the processing is to be performed.

In greater detail, the connection means 20 comprise two fixing heads 21, one for each one of the free ends 2a and 4a, for the connection of the free ends 2a and 4a respectively to the mechanical piece 16 and to the fixed part 17 of the machine.

Each fixing head 21 is associated with the respective free end 2a or 4a by means of a pivot 22, which is jointly connected in translational motion to the respective free end 2a or 4a and ends with a ring 23 which is accommodated in a fork-like element 24, which can be fixed to the mechanical piece 16 to be processed or to the fixed part 17 of the machine with which the processing is to be performed.

In this manner, at least one joint 25 is provided for the orientation of the hollow body. 2 and of the movable stem 4 with respect to the mechanical piece 16 and with respect to the fixed part 17.

Moreover, in order to fix the locking device 1, each joint 25 has a locking screw 26, which is adapted to mutually couple the parts that form the joint 25.

Further, there are means 27 for adjusting the tension of the hollow body 2 and of the movable stem 4, when they are mutually locked by way of the radial expansion means 5 and are respectively connected to the mechanical piece 16 and to the fixed part 17 by way of the connection means 20.

The adjustment means 27 comprise at least one threaded ring 28, which can be screwed onto a threaded shank 29 formed by one of the free ends 2a and 4a and more precisely, in the proposed embodiment, by the free end 2a, and is associated rotatably with a support 34 in which one of the pivots 22 is screwed by means of the threaded hole 35.

In this manner, the connection means 20 related to the free end 2a, i.e., the respective pivot 22, are associated directly with the threaded ring 28.

In order to prevent the movable stem 4 from sliding completely out of the hollow body 2, there are means 29 for limiting the stroke of the movable stem 4 with respect to the hollow body 2, which comprise a flanged element 30, which is associated with the end of the movable stem 4 that is inserted in the hollow body 2.

The flanged element 30 can engage by abutment alternately an end portion 7b of the tubular element 7 that is accommodated in the hollow body 2 or an abutment wall 31 that is formed in the hollow body 2 and more precisely by the bottom of the sliding seat 3, respectively, to define the maximum or minimum extraction position of the movable stem 4 with respect to the hollow body 2.

The operation of the locking device 1 for mechanical pieces, particularly for pieces subjected to mechanical processing or similar, is clear and evident from what has been described.

More precisely, by extracting manually the movable stem 4, which has an adapted length that is variable according to the requirements by way of the modularity of the modular parts 19, from the hollow body 2, it is possible to fix the fixing heads 22 respectively to the mechanical piece 16 and to the fixed part 17 of the machine, orienting appropriately the entire locking device 1 by means of the joints 25.

Once the fixing heads 22 have been fixed and the joints 25 have been locked by means of the locking screws 26, the pressurized fluid 9 is pumped into the interspace 8, deforming radially the tubular element 8 so as to couple axially the hollow body 2 and the movable stem 4 to each other.

Subsequently, by acting on the threaded ring 28, the locking device 1 is tensioned further, so as to further stabilize the mechanical piece 16 with respect to the fixed part 17 of the machine, making the locking device 1 work both by traction and by compression.

This stabilization can occur manually or by means of a hook wrench, so as to provide controlled preloadings.

Once mechanical processing has been completed, by releasing the pressure circuit the movable stem 4 is disengaged from the hollow body 2, allowing disassembly of the locking device 1 from the mechanical piece 16 and from the fixed part 17.

In practice it has been found that the locking device for mechanical pieces, particularly for pieces subjected to mechanical processing or similar, according to the present invention, fully achieves the intended aim and object, since it allows to provide a system for gripping the piece to be processed that can be modulated extremely, such as to allow processing of mechanical pieces having different dimensions and shapes, reducing the number of fixture elements to be used to lock the mechanical piece to be processed and the machine.

Further, the simplicity of the locking device according to the present invention allows rapid use thereof with consequent reduction of transit time and machine downtime.

Another advantage of the locking device according to the present invention is that it is possible to stabilize the mechanical piece to be processed during processing even in the presence of an irregular geometry that would require custom-made fixtures.

A further advantage of the locking device according to the present invention is that it is possible to avoid flexing and vibration during processing steps due to the thrust of the tool on the mechanical piece being processed.

Another advantage of the locking device according to the present invention is that it is possible to avoid locking tensions on the mechanical piece to be processed which might move such piece from its original position.

A further advantage of the locking device according to the present invention is that it facilitates the operation for locking the piece to be processed.

Another advantage of the locking device according to the present invention is that it is compact thanks to its elongated shape.

A further advantage of the locking device according to the present invention is that it facilitates the operation for locking the piece to be processed.

The locking device for mechanical pieces, particularly for pieces subjected to mechanical processing or similar, according to the present invention, thus conceived is susceptible of numerous modifications and variations, all of which are within the scope of the inventive concept.

All the details may further be replaced with other technically equivalent elements.

In practice, the materials employed, so long as they are compatible with the specific use, as well as the contingent shapes and dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A locking device for a mechanical piece comprising at least one hollow body that forms a sliding seat, a movable stem that is accommodated slidingly partially within said sliding seat and radial expansion means which are interposed between said hollow body and said movable stem and are adapted to mutually lock said hollow body and said movable stem, said movable stem protruding partially from said hollow body with said hollow body and said movable stem jointly connectable, at their free ends, by way of means for connection, respectively, to said mechanical piece or a fixed part of a machine with which said mechanical piece is to be processed, wherein said radial expansion means comprise an elastically deformable tubular element, which is fitted slidingly on said movable stem and is jointly accommodated with play within said sliding seat so as to form, between the outside wall of said tubular element and the inside wall of said sliding seat, at least one empty interspace, which is closed and can be connected functionally to a system for dispensing a pressurized fluid in order to introduce said pressurized fluid into said at least one interspace, so as to deform elastically said tubular element and lock the translational motions of said movable stem with respect to said hollow body and vice versa, as a consequence of the increase in pressure in said at least one interspace.

2. The locking device according to claim 1, wherein said hollow body is substantially cylindrical.

3. The locking device according to claim 1, further comprising at least one connector element, which is jointly connected to said hollow body, is connected to said at least one interspace and can be connected to said dispensing system for the passage of said pressurized fluid into said at least one interspace.

4. The locking device according to claim 1, wherein said connection means comprise two fixing heads, one for each one of said free ends for the connection of said free ends respectively to said mechanical piece and to said fixed part, said fixing heads comprising at least one joint for the orientation of said hollow body and of said movable stem with respect to said mechanical piece and with respect to said fixed part.

5. The locking device according to claim 1, further comprising at least one threaded ring, which can be screwed onto a threaded shank formed by one of said free ends.

6. The locking device according to claim 1, wherein said movable stem is composed of a plurality of modular parts.

7. The locking device according to claim 1, further comprising stroke limiting means for limiting a stroke of said movable stem with respect to said hollow body.

8. The locking device according to claim 7, wherein said stroke limiting means comprise a flanged element, which is placed on the end of said movable stem that is inserted in said hollow body, said flanged element being engageable by abutment alternately with an end portion of said tubular element accommodated in said hollow body or with an abutment wall formed in said hollow body, respectively, in order to define the maximum or minimum extraction position of said movable stem with respect to said hollow body.

9. The locking device according to claim 8, wherein said sliding seat is blind and said abutment wall is formed by the bottom of said sliding seat.

* * * * *